United States Patent [19]
Cahill et al.

[11] Patent Number: 5,629,243
[45] Date of Patent: May 13, 1997

[54] PRELOADED LINEAR BEAM VIBRATION SENSOR AND ITS MANUFACTURING METHOD

[75] Inventors: Sean S. Cahill, Palo Alto, Calif.; Walter Shoeys, Perly, Switzerland; Kenichi Nakamura, Tokyo, Japan

[73] Assignee: Tokyo Gas Co., Ltd., Tokyo, Japan

[21] Appl. No.: 528,043

[22] Filed: Sep. 14, 1995

Related U.S. Application Data

[62] Division of Ser. No. 346,261, Nov. 23, 1994.

[51] Int. Cl.$^6$ ............................................. H01G 5/18
[52] U.S. Cl. .......................... 438/50; 73/514.32; 73/654; 438/739
[58] Field of Search .......................... 73/654, 514.32, 73/514.36, 514.37, 514.02, 514.22; 437/228, 919; 156/657.1

[56] References Cited

U.S. PATENT DOCUMENTS 4,736,629  4/1988  Cole ........................................ 73/514.36

*Primary Examiner*—John E. Chapman
*Attorney, Agent, or Firm*—Armstrong, Westerman, Hattori, McLeland & Naughton

[57] ABSTRACT

A method is described for manufacturing a miniaturized accelerometer having a narrow bandwidth and behaving as a switch sensitive only to low frequencies such as are contained in earthquakes. The method includes provision of an unbalanced see-saw beam assembly composed of beams 2 and masses 3 at opposite ends of the beams 2. The beams 2 have their suspension at a location with slightly different distances from the masses 3 along a line parallel to and vertically offset from the line connecting centers of gravity of the masses 3.

2 Claims, 14 Drawing Sheets

PRELOADED LINEAR BEAM VIBRATION SENSOR AND ITS MANUFACTURING METHOD

This is a division of application Ser. No. 08/346,261 filed Nov. 23, 1994.

BACKGROUND OF THE INVENTION

1. Field of the Invention

This invention relates to a micro-accelerometer made by micromachining techniques and used to detect earthquakes. The invention also relates to a preloaded linear beam vibration sensor (i.e. an unbalanced see-saw type vibration sensor) made by micromachining techniques.

2. Description of the Prior Art

Individual terminals of a gas supply network must be shut quickly and reliably in the event of large-scale earthquakes. For this purpose, an earthquake sensor is equipped with each user's terminal of the network to detect earthquakes and to shut the terminal in response to a detection signal.

Existing accelerometers for detecting an earthquake can be classified into two types: one of a broad band type using a small vibrator and capable of detecting vibrations over broad bands, and the other of a narrow band type whose frequency characteristics are limited to low frequencies so as to detect only earthquake frequencies. These accelerometers have arrangements in which a mass is connected to a frame via a spring so as to detect acceleration in terms of changes in relative position between the mass and the frame.

In order to implement a linear accelerometer with a low natural frequency to be sensitive only to low frequencies; i.e. vibrations contained in earthquakes, the accelerometer needs to be large. For instance, to detect an acceleration of 100 Gal below 1 Hz with an accelerometer having a natural frequency of 1 Hz, a displacement of the mass-spring system in the accelerometer of 2.5 cm is required. For allowing such a large displacement in a linear system, its vibrator must be, at least, as long as the length of the displacement, and cannot take advantage of using micromachining techniques to fabricate the accelerometer.

Accelerometers for detecting earthquakes should ignore accelerations of frequencies above 5 Hz in order to eliminate influences of noise. Existing wide band accelerometers have very high band resonant frequencies, typically 1000 Hz or more. If such a wide band accelerometer is used to detect earthquake waves, then it may erroneously recognize traffic or other vibrations as earthquakes. In order to overcome the problem, they need an electric filter for removing high frequency components from detection signals so as to extract only earthquake signals.

FIG. 15 shows a basic structure of an earthquake sensor currently used in gas meters. The earthquake sensor 100 uses a steel ball 150 housed in a container 110 having a funnel-like cavity 130 in the center of its bottom 120. When an acceleration is applied to the container 110, the steel ball 150 runs up the slope 131 of the cavity 130, and touches an electrode 141 provided on the circumferential wall 140 of the container 110, thus short-circuiting the electrode 141 and another electrode 121 at the bottom, causing a signal indicating application of an acceleration above a predetermined value to be exerted.

This acceleration sensor exhibits the characteristics shown in FIG. 16 indicating acceleration (Gal) on the ordinate and displacement (mm) on the abscissa. That is, when the inner diameter of the housing 110 is 21.6 mm, the diameter of the steel ball 150 is 15.9 mm, and the angle $\alpha$ of the slope of the cavity 130 is 6.42 degrees, the steel ball moves 2.477 mm at the acceleration of $(5/7) \cdot M \cdot g \cdot \sin\alpha \cdot \cos\alpha$ and causes a detection signal to be exerted. In the equation, M is the mass of ball, and g is the gravitational acceleration.

An accelerometer used as a seismograph requires sensitivity to accelerations of 85 to 150 Gal for frequencies between 1 and 5 Hz, and requires a roll-off (decrease in sensitivity) of approximately 60 dB per decade of frequencies above 5 Hz.

In order that a detector element does not largely deform when an earthquake acceleration is applied, the detector element must be small, and the use of micromachining techniques to make such accelerometers would be advantageous. In addition, such accelerometers themselves for detecting earthquake waves must have a narrow detection bandwidth of approximately 1 to 5 Hz to eliminate the need for an expensive low pass electric filter.

OBJECT OF THE INVENTION

It is therefore an object of the invention to provide a miniaturized accelerometer sensitive only to low frequencies, such as earthquake waves, and having a function of a switch, without requiring an external circuit.

More specifically, it is an object of the invention to provide a very compact and low-cost accelerometer having frequency characteristics of 0 to 10 Hz and the threshold acceleration of 150 Gal, and consuming power as low as that causing 2 μA, or less, current to flow when driven with 3 V.

Another object of the invention is to provide an accelerometer which exerts a signal only when an acceleration exceeds a threshold.

SUMMARY OF THE INVENTION

To attain the objects, the invention provides a preloaded linear beam vibration sensor, comprising: a see-saw beam having a mass at each end thereof and having a support at a point with slightly different distances from the masses along a line parallel to, and vertically offset from, the line connecting centers of gravity of the masses; and controlling means for regulating the direction of pivotal rotation of the see-saw beam.

Another version of the preloaded linear beam vibration sensor according to the invention, comprises: an unbalanced see-saw-shaped see-saw beam having its pivotal support in a central portion thereof and having a mass at each end thereof, the support being provided at a point with slightly different distances from the masses along a line parallel to, and vertically offset from, the line connecting centers of gravity of the masses; regulating means for controlling the direction of pivotal rotation of the see-saw beam; a main body provided with the beam, the support and the regulating means; and a cap bonded to the main body and having electrodes with which the see-saw beam can contact during its rotation.

The invention further provides a method for manufacturing a preloaded linear beam vibration sensor including an unbalanced see-saw-shaped see-saw beam having its suspension at a central portion thereof and a mass at each end thereof, comprising the steps of: integrally making on a substrate via a layer of an oxide two parallel beams, two masses connecting the beams at respective ends and hinge posts extending from the beams at a location with slightly different distances from the masses; providing on the substrate a hinge which covers the hinge posts via an oxide film;

etching part of the substrate underlying the see-saw beam to make a space allowing a pivotal movement of the see-saw beam; and removing the oxide film covering the see-saw beam to make it float from the hinge.

Since the suspension of the see-saw beam is at a position having slightly different distances from the two masses along a line parallel to the line connecting centers of gravity of two masses, with the aid of a mechanical stopper, the beam normally rests dynamically balanced. When an acceleration overcoming the supporting force from the mechanical stopper is imparted, the beam can move away from the mechanical stopper. If the beam were supported at the center of gravity of the masses, the beam would pivotally rotate under any external acceleration, and the angle of rotation would have to be measured to determine the magnitude of the acceleration. In contrast, eccentric suspension of the beam causes the sensor to rotate only with an acceleration above a predetermined threshold, which makes it possible to detect an earthquake only by knowing whether the beam has moved or not.

Eccentricities and the threshold acceleration have the relationship shown below. With reference to FIG. 14, threshold acceleration $A_{cct}$ can be defined as $A_{cct} = g \cdot d/d_2$. That is, the threshold acceleration $A_{cct}$ at which the sensor starts to move can be freely modified by adjusting d and $d_2$ on its design.

Vertical eccentricity of the see-saw beam suspension from the line connecting centers of gravity of two masses provides an effective rotating radius, square root of $\{[(\text{length of the beam}) \times \frac{1}{2}]^2 + (\text{vertical eccentricity})^2\}$, which is longer than the actual length, and provides a miniaturized system sensitive to low frequencies only.

DETAILED DESCRIPTION OF THE PREFERRED EMBODIMENTS

The preloaded linear beam vibration sensor according to the invention features an unbalanced see-saw beam hinged near the center and having mass at opposite ends. The sensor is also characterized in that the point of suspension is slightly off-center along a line parallel to, and largely offset upward from, the line between the centers of the two masses at opposite ends of the see-saw.

Figure 14:
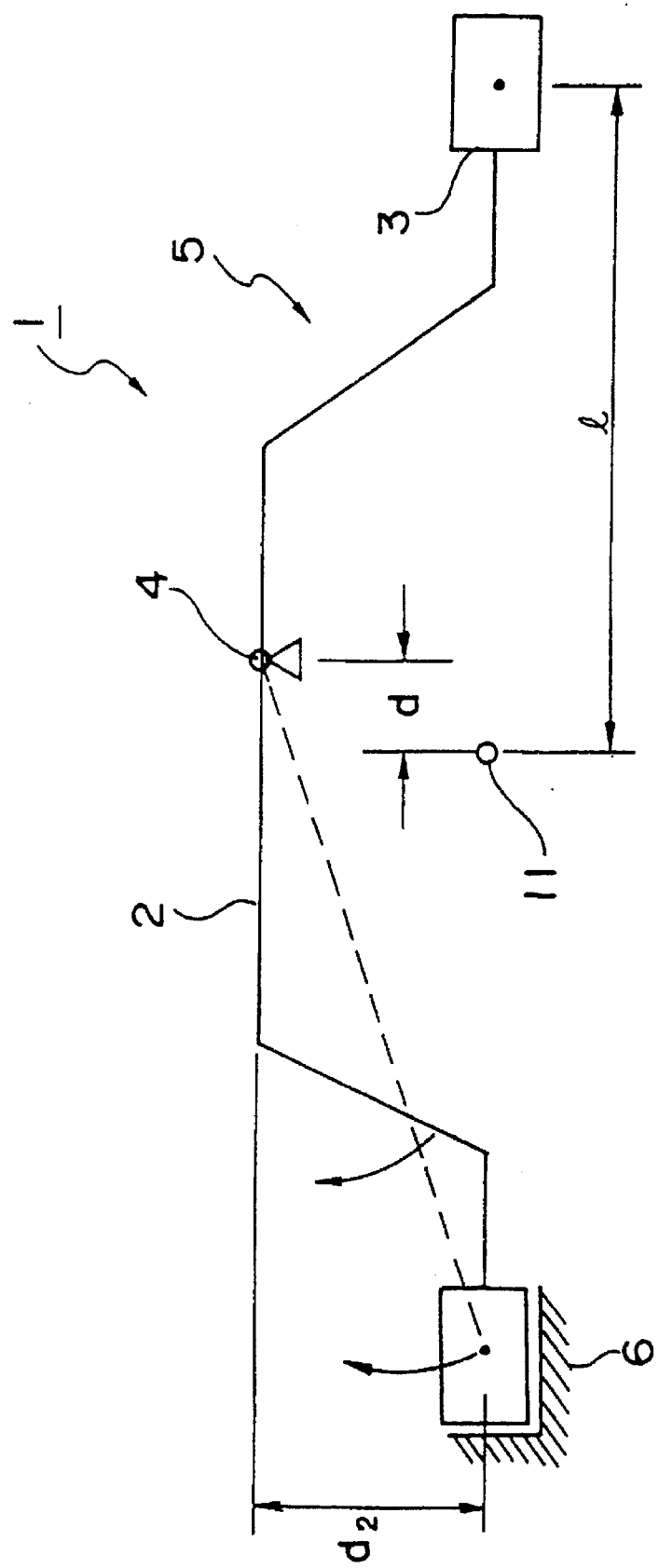
FIG. 14 is a diagram showing the principle of operation a preloaded linear beam vibration sensor according to the invention.
Figure 15:
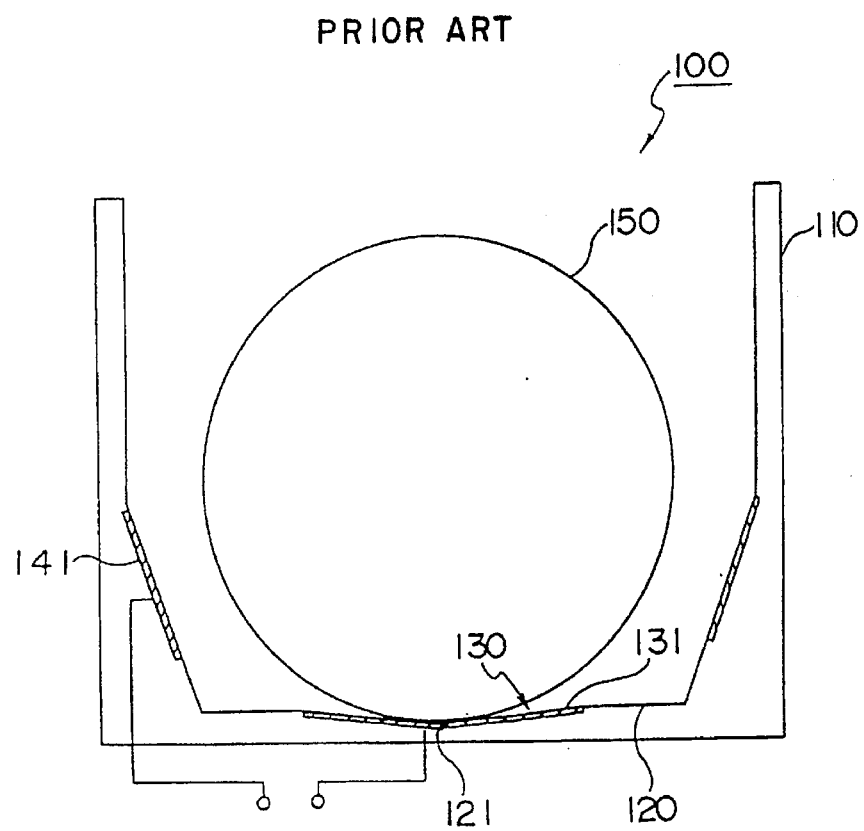
FIG. 15 is a diagram showing the principle of operation of operation of an existing accelerometer.
Figure 16:
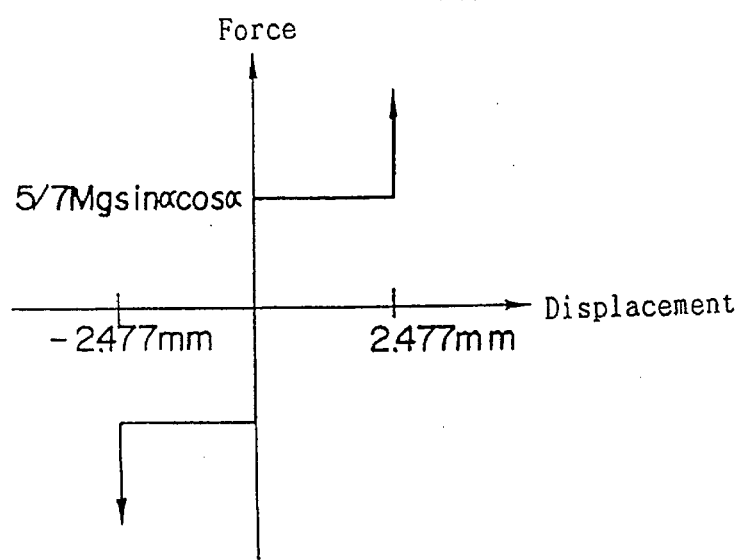
FIG. 16 is a diagram showing behaviors of the existing accelerometer.

The principle structure of the unbalanced see-saw is shown schematically in FIG. 14. The unbalanced see-saw 1 includes a rigid beam 2 having the length, l, two masses 3, 3 equal in weight (M/2) and provided at opposite ends of the beam 2, a point of suspension 4 pivotally supporting the beam at a position offset by distance d from the center of gravity of the two masses 3, 3, and a mechanical stopper 6 for preventing the movement of the see-saw structure in one direction. The point of suspension 4 is located at a position upwardly offset by distance $d_2$ from the line between the centers of the two masses 3, 3.

Assume that the point of suspension 4 has no friction, the beam 2 is rigid and massless, and the masses are mass points each weighing M/2. Then the unbalanced see-saw obeys the following equation of motion:

$$I \cdot \frac{d}{dt} \cdot \frac{d}{dt} \theta + C \cdot \frac{d}{dt} \theta = \quad (1)$$

$$-M \cdot g \cdot (d \cdot \cos\theta + d_2 \cdot \sin\theta) + M \cdot acc \cdot (d_2 \cdot \cos\theta - d \cdot \sin\theta)$$

where θ is angular displacement from the position at rest; M is the total mass of both masses 3 together; g is the gravitational acceleration, acc is lateral acceleration due to an earthquake; C is the damping constant, and I is the moment of inertia about the suspension point 4. Note that if the see-saw structure is touching the mechanical stopper 6, the mechanical stopper may exert a force onto the see-saw structure. This force has not been incorporated in equation 1, i.e. the equation only holds when the see-saw structure is no longer touching the mechanical stopper, or when the stopper does not exert any force.

If d<<l is effective, the moment of inertia can be approximated as:

$$I = M(l^2 + d^2{}_2) \quad (2)$$

Since the displacement x(t) is movements of the masses 3, 3 along circles centered at the point of suspension 4, it is expressed by:

$$x(t) = \theta(t) \cdot \sqrt{l^2 + (d_2)^2} \quad (3)$$

When assuming that the displacement from the position at rest is small, since $\sin\theta \approx \theta$ and $\cos\theta \approx 1$, Equation (1) can be rewritten as:

$$I \cdot \frac{d}{dt}\left(\frac{d}{dt}\theta\right) + C \cdot \frac{d}{dt}\theta = \quad (4)$$
$$-M \cdot g \cdot (d + d_2 \cdot \theta) + M \cdot acc \cdot (d_2 - d \cdot \theta)$$

By introducing I from Equation (2), Equation (4) can be written as:

$$[l^2 + (d_2)^2] \cdot \left[\frac{d}{dt}\left(\frac{d}{dt}\theta\right)\right] + \quad (5)$$
$$\frac{C}{M} \cdot \frac{d}{dt}\theta + (d_2 \cdot g + d \cdot acc)\theta = d_2 \cdot acc - d \cdot g$$

This equation of motion is nonlinear; however, since g is ten times the input acceleration, or even larger, and $d_2$ is much larger than d, the term $d_2 g$ is much larger than the term d·acc, and Equation (5) can be rewritten as:

$$[l^2 + (d_2)^2] \cdot \left[\frac{d}{dt}\left(\frac{d}{dt}\theta\right)\right] + \quad (6)$$
$$\frac{C}{M} \cdot \frac{d}{dt}\theta + d_2 \cdot g \cdot \theta = d_2 \cdot acc - d \cdot g$$

By using x(t) of Equation (3) in Equation (6) the following equation is obtained:

$$\frac{d}{dt}\left(\frac{d}{dt}x\right) + \frac{C}{M} \cdot \frac{1}{l^2 + (d_2)^2} \cdot \frac{d}{dt}x + \quad (7)$$
$$\frac{d_2 g}{l^2 + (d_2)^2} \cdot x = \frac{d_2}{\sqrt{l^2 + (d_2)^2}} \cdot \left(acc - g\frac{d}{d_2}\right)$$

Equation (7) is an equation of motion for the first-order analysis, and constant $\lambda$ is expressed by:

$$\lambda = \frac{d_2}{\sqrt{l^2 + (d_2)^2}} \quad (8)$$

In this equation, the natural frequency is determined by the dimensions of the see-saw structure and not by the magnitude of the masses. The term 'g·d/d$_2$' on the right hand side denotes minimum magnitude of the acceleration at which the see-saw structure starts to move. By choosing the dimensions of the see-saw structure appropriately, and having a suspension point without friction, a structure with a low resonant frequency can be obtained, capable of detecting earthquake vibrations while not being sensitive to higher frequency vibrations.

Figure 1:
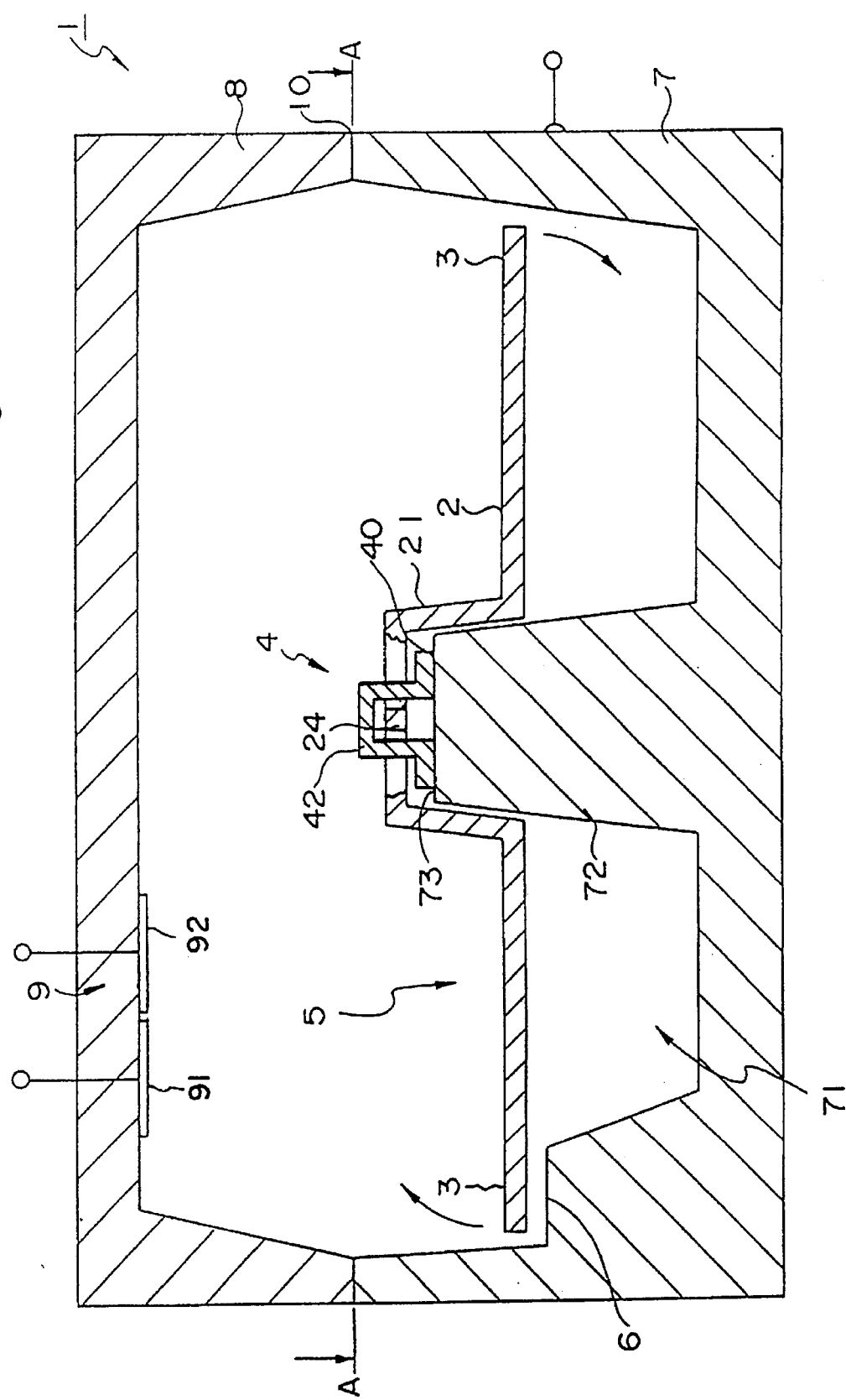
FIG. 1 is a cross-sectional view showing a concept of construction of a preloaded linear beam vibration sensor according to the invention.
Figure 2:
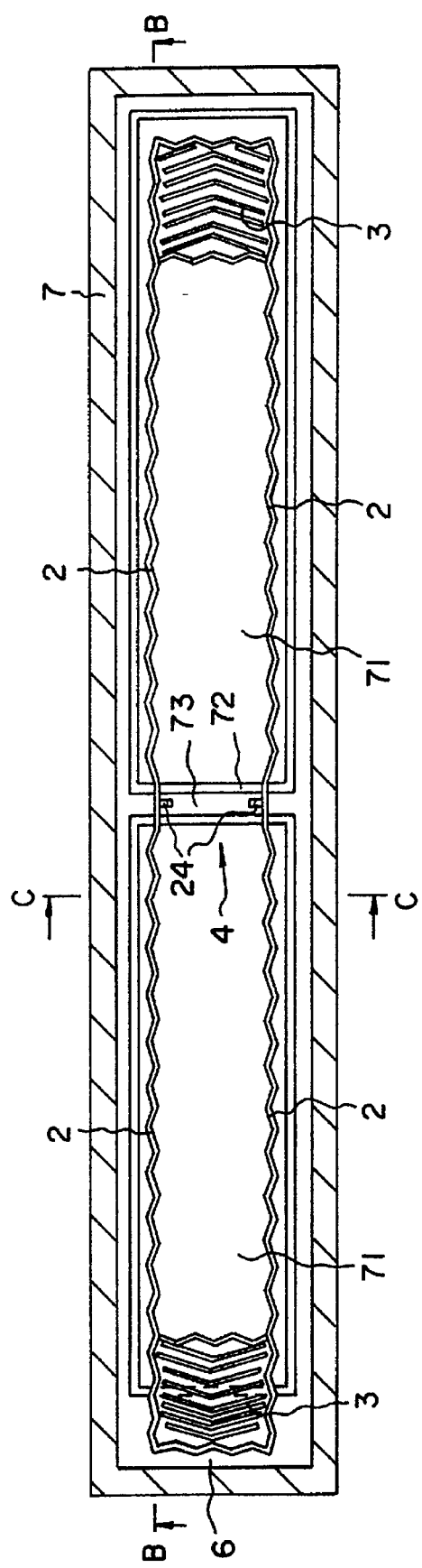
FIG. 2 is a cross-sectional view of the preloaded linear beam vibration sensor according to the invention, taken along the A—A line of FIG. 1.
Figure 3:
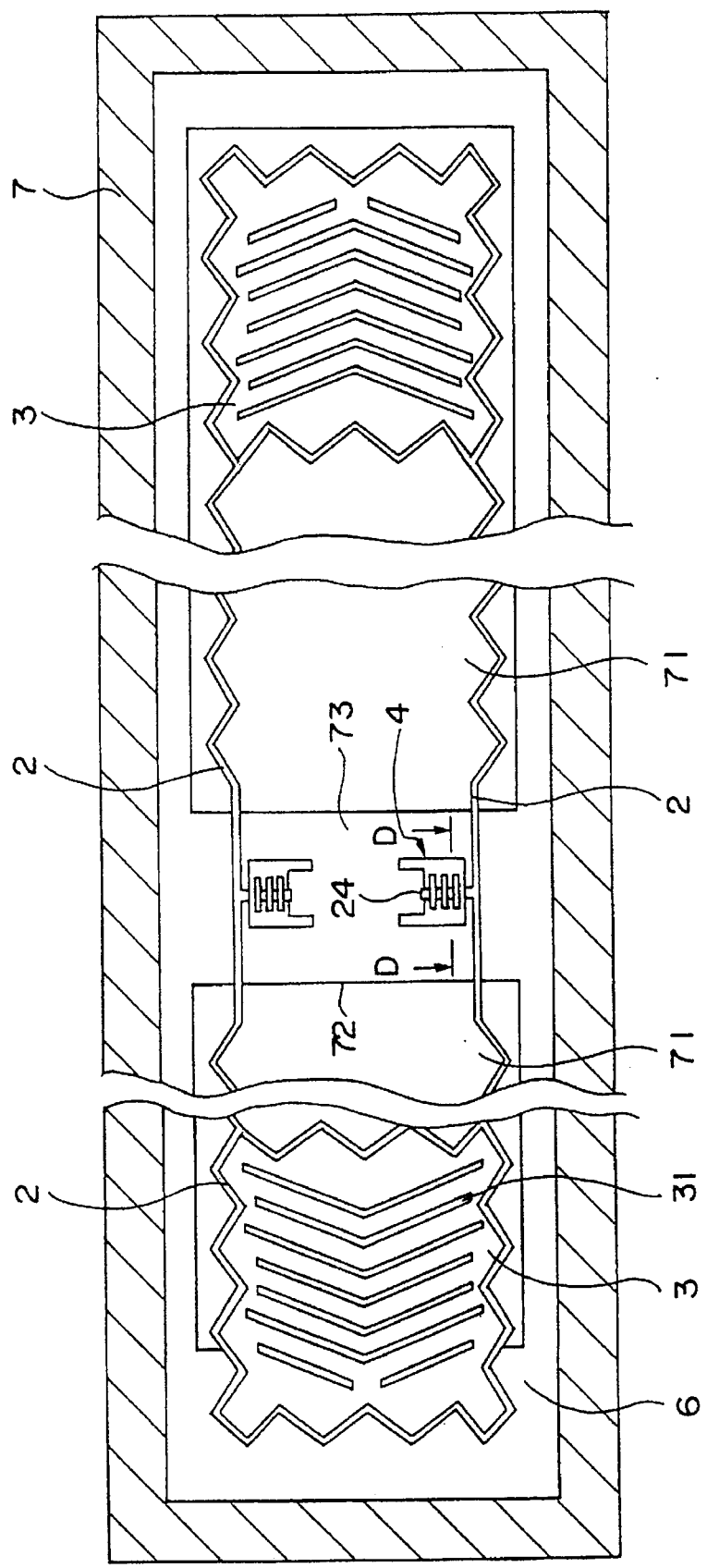
FIG. 3 is a fragmentary, enlarged, cross-sectional view of selective parts of the preloaded linear beam vibration sensor according to the invention shown in FIG. 2.

A specific arrangement of the preloaded linear beam vibration sensor according to the invention will now be described below with reference to FIGS. 1 to 3. FIG. 1 is a schematic view of a longitudinal cross section of the preloaded linear beam vibration sensor, which is somewhat different from its real scale. FIG. 2 is a cross-sectional view of the sensor, taken along the A—A line of FIG. 1, and FIG. 3 is an enlarged fragmentary representation of FIG. 2.

The preloaded linear beam vibration sensor 1 according to the invention is generally composed of a silicon substrate 7 having a see-saw portion 5 and a glass cup 8 having an electrode metallization 9 and anodic-bonded (10) to the silicon substrate 7. The see-saw portion 5 includes beams 2, 2 having hinge posts (rotating rods) 24 supported by a hinge portion 4 provided on a bank-shaped pedestal portion 72 upstanding in a central location of the silicon substrate 7, and masses 3, 3 at opposite ends of the beams 2, 2. A mechanical stop 6 is made below one of the masses to restrict its counterclockwise rotation.

The silicon substrate 7 has an elongated cavity 71 across which the bank-shaped pedestal portion 72 extends in its central location. The hinge portion 4 for suspending the beam 2 is formed on the top planar surface 73 of the bank-shaped pedestal portion 72.

The parallel extending beams 2, 2 are made by using polysilicon. The parallel beams 2, 2 have, at their opposite ends, the masses 3, 3 made by using polysilicon as an integral body continuous from the both beams 2, 2. The beams 2, 2 have, at their central portions, upstanding portions 21, 21 so that the point of suspension 4 lies above the masses 3, 3 by the distance $d_2$. The hinge posts 24, 24 extend inward from intermediate positions of the beams 2, 2 at locations longitudinally offset by the distance d from the center of gravity of the masses 3, 3 at opposite ends of the beams 2, 2. The hinge posts 24, 24 are pivotally supported by the hinge portion 4.

Figure 4:
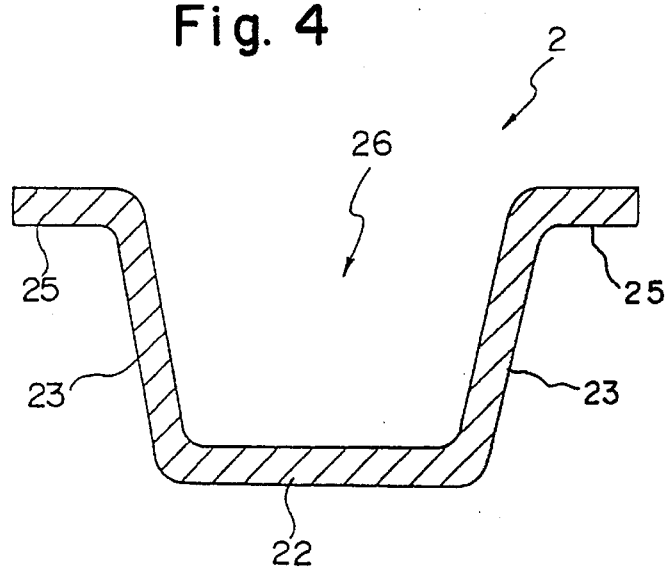
FIG. 4 is a cross-sectional view of a beam of the preloaded linear beam vibration sensor according to the invention.

FIG. 4 shows a cross section of the beam 2 generally in the form of letter U, which includes an elongated bottom 22 extending in its length direction, upstanding portions 23, 23 standing from opposite side edges of the bottom 22, and lips 25, 25 extending horizontally from upper ends of the upstanding portions, so that a groove 26 is defined in the center. This structure of the beams 2, 2 may be made by making a groove in the silicon substrate 7 by reactive ion etching (RIE) before depositing the polysilicon film as the material of the beams 2, 2 on the silicon substrate 7, as will be explained later with reference to a possible manufacturing process. This cross-sectional configuration makes the beams 2, 2 rigid in both the longitudinal and lateral directions.

Figure 5:
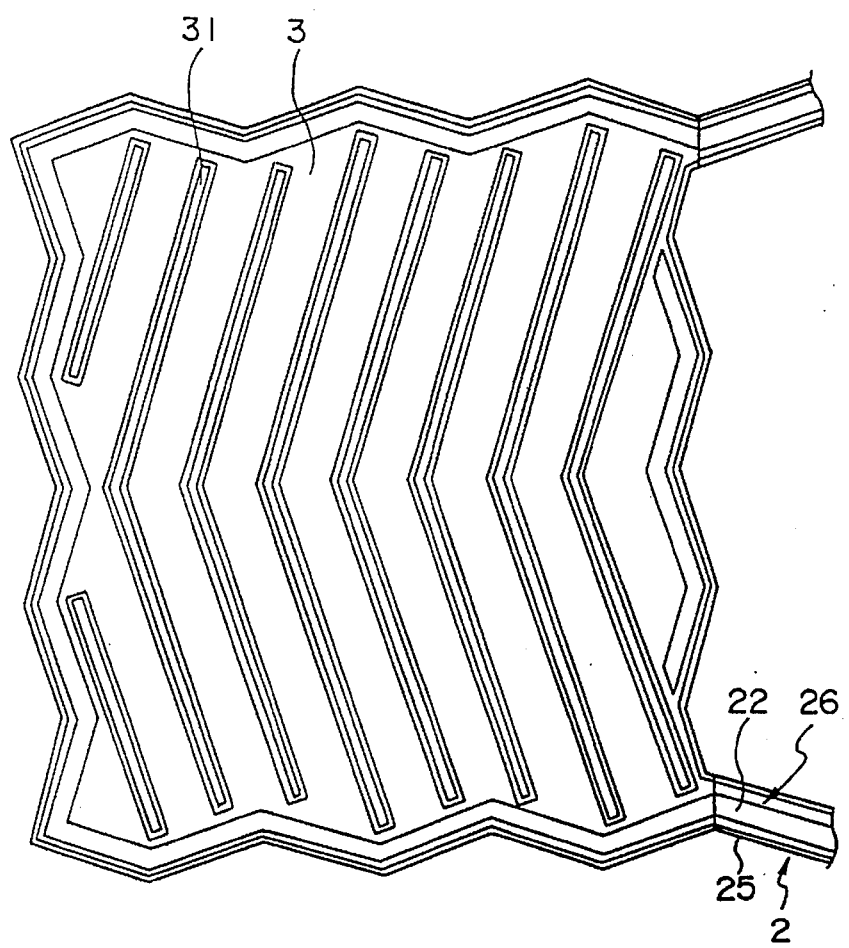
FIG. 5 is a plan view of a part of a mass of the preloaded linear beam vibration sensor according to the invention.

Also, the beam 2 is slightly zig-zag-shaped in its length direction so that the part of the silicon substrate underlying the beams 2, 2 can be equally dug in when making the cavity 71. Likewise, as shown in FIG. 5, part of the beams 2, 2 encircling the masses 3, 3 is slightly zig-zag-shaped and slits 31 are provided so that the part of the silicon substrate 7 underlying the masses 3, 3 can be equally dug in without interference of shades of the masses 3, 3 when making the cavity 71.

Figure 6:
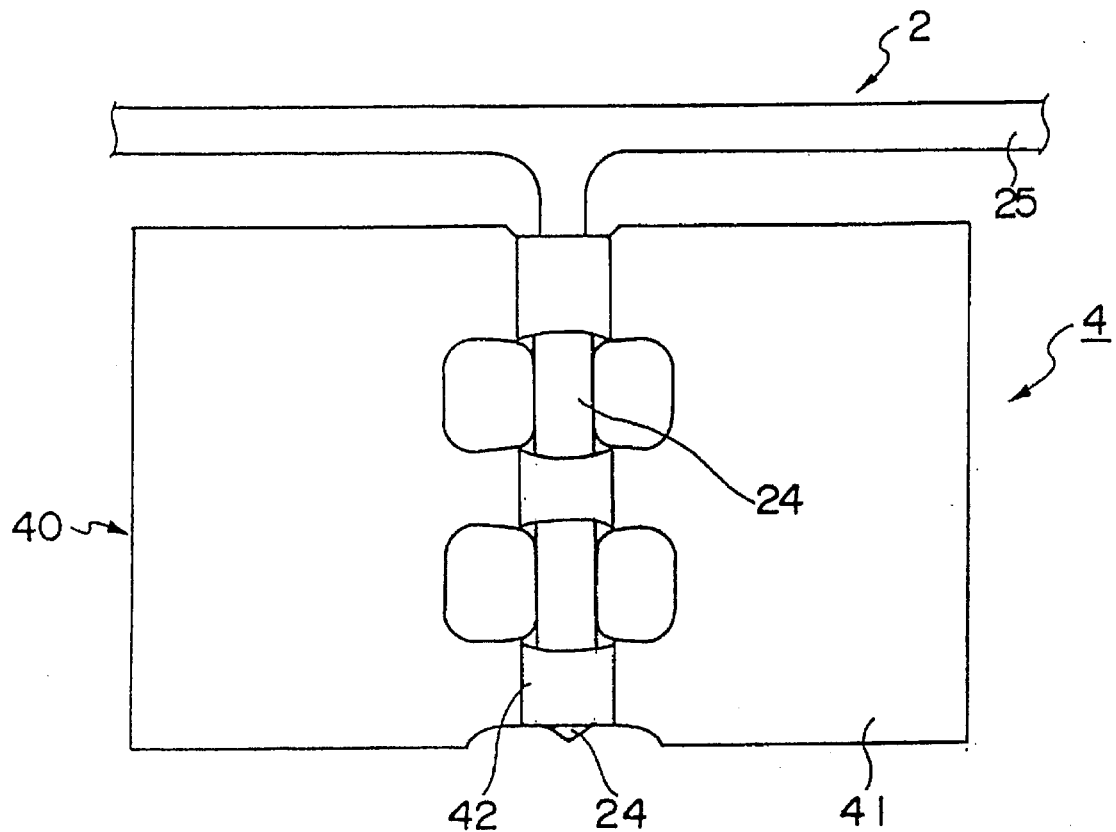
FIG. 6A is an enlarged plan view of a hinge portion of the preloaded linear beam vibration sensor according to the invention.
FIG. 6B is a cross-sectional view of the hinge portion shown in FIG. 6A.
Figure 6:
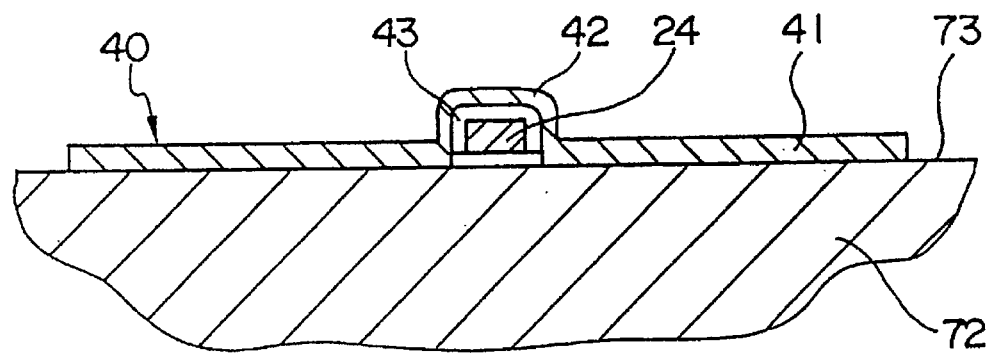

FIGS. 6A and 6B show the hinge portion 4 in an enlarged scale. FIG. 6A is a plan view of the hinge portion, and FIG. 6B is a cross-sectional view. As shown in FIG. 3 the hinge portion 4 includes a pair of hinges 40 and associated hinge posts 24 (only one set of which is illustrated in FIG. 6). The hinge 40 includes an anchor plate 41 fixing the hinge 40 to the top surface 73 of the bank-shaped pedestal portion 72, and a hinge post receiver 42 bulging up from the anchor plate 41. The hinge post 24 extends inward from the beam 2 and is received in a journal opening defined in the hinge post receiver 42 via a gap 43 formed in the inner walls of the bulging portion of the hinge post receiver 42.

Each mass 3 is made conductive by ion implantation or other method, and two electrodes 91 and 92 are formed on the glass cap 8. Then, by applying a voltage across the electrodes 91 and 92 and by measuring changes in capacitance of capacitors formed between the electrodes 91, 92 and the mass 3, it can be determined whether the mass 3 has moved or not.

That is, when the capacitance between one of the electrodes, 91, and the mass 3 is Co, the capacitance of the two electrodes 91, 92 becomes Co/2 because it is equivalent to serial connection of two Co capacitors. Since Co varies in reverse proportion to the distance between the mass and the electrode, whether the mass has moved or not can be known by measuring changes in capacitance between the two electrodes 91, 92.

With the eccentrically supported linear beam vibration sensor having the above-described construction, a large effective width of vibration can be realized by using a significantly long beam (length: l) and a relatively small vertical eccentricity ($d_2$) to satisfy $r^2=l^2+d_2^2$. In addition, the roll-off characteristic can be determined by elongating the beam regardless of the mass of the beam. Further, by implementing the point of suspension 4 with horizontal and vertical eccentricities, the acceleration threshold can be determined as acc·t=gd/$d_2$ (see equation 7).

Explained below is the relation between the hinge post 24 and the see-saw beam 5 with reference to FIGS. 7A and 7B in which the hinge post 24 and the hinge post receiver 42 are illustrated in greater detail. The beam 2 lies horizontal in FIG. 7A but is slanted in FIG. 7B. The rotation of the beam 2 is controllably limited in the counterclockwise direction by the mechanical stopper 6 (see. FIG. 1).

Figure 7A:
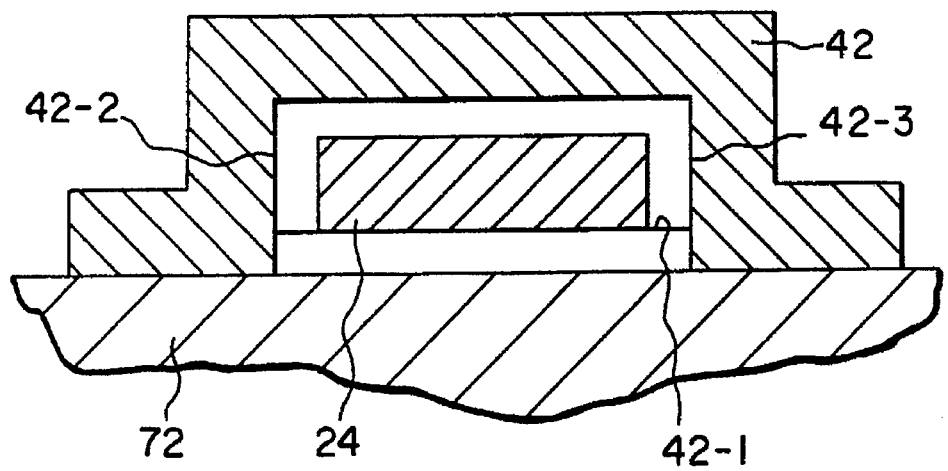
FIGS. 7A and 7B are cross-sectional views showing relations between a hinge post and the center of gravity of the see-saw beam of the preloaded linear beam vibration sensor according to the invention.
Figure 7B:
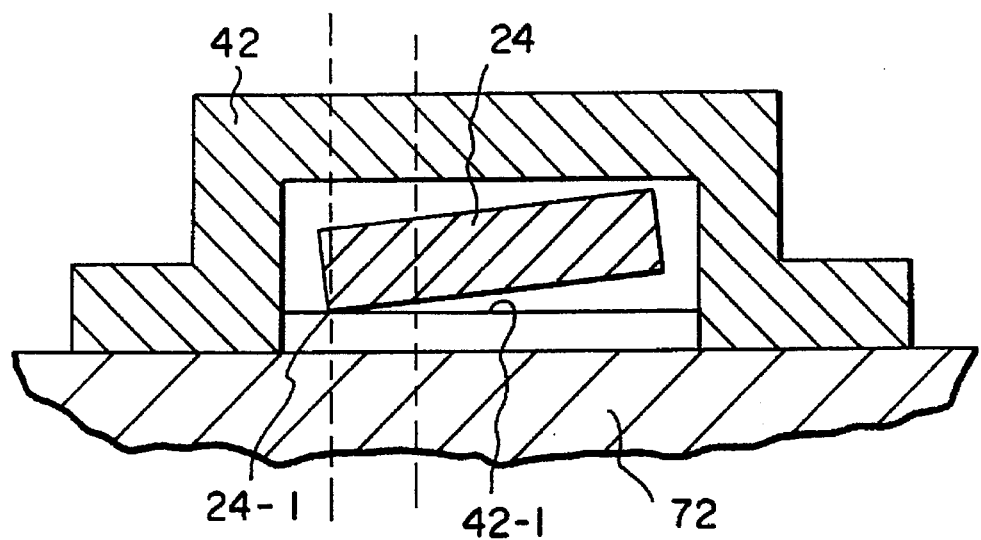

When the beam 2 maintains its horizontal posture with no external acceleration applied, the hinge post 24 contacts the bottom 42-1 of the hinge post receiver 42 with its entire lower surface, and it is equally distant by a gap of about 1300 Å from the left and right walls 42-2, 42-3 of the hinge post receiver 42 as shown in FIG. 7A. When an external acceleration is applied to the beam 2, the resultant force couple causes the hinge post 24 to rotate about one of edges, 24-1, of its lower surface as shown in FIG. 7B. Then the edge 24-1 behaves as the point of suspension 4 of the see-saw beam. Therefore, in order to implement the see-saw beam suspension with appropriate eccentricities between the center of gravity and the center of rotation, i.e. the suspension point, one has to take it into account that, when the see-saw structure tilts, the edge of the respective hinge posts is the actual suspension point.

Explained below is a possible method for fabricating the preloaded linear beam vibration sensor according to the invention with reference to FIGS. 8A to 8D, 9A to 9D, 10A to 10E, 11A to 11B, 12A to 12D and 13A to 13D. FIGS. 8A to 8D illustrate a process for making a part of the cavity in the silicon substrate 7. First explained are the steps for making an oxide film and an alignment mark for making the cavity in the substrate 7.

Figure 8A:
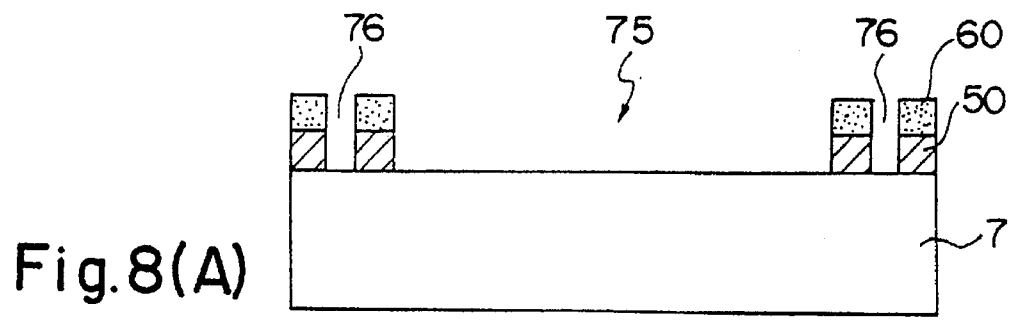
FIGS. 8A to 8D are diagrams showing a first process sequence for manufacturing the preloaded linear beam vibration sensor according to the invention.

The silicon substrate 7, sufficiently cleaned, is wet-oxidized in an atmosphere composed of 1 l oxygen and 1 l hydrogen at 1000° C. to form a 6000 Å thick oxide film 50 on the surface. The oxide film 50, after-masked by a photoresist mask 60, is etched by BHF etching to make a hole 75 for the cavity 71 and a hole 76 as the alignment mark (FIG. 8A).

Figure 8B:
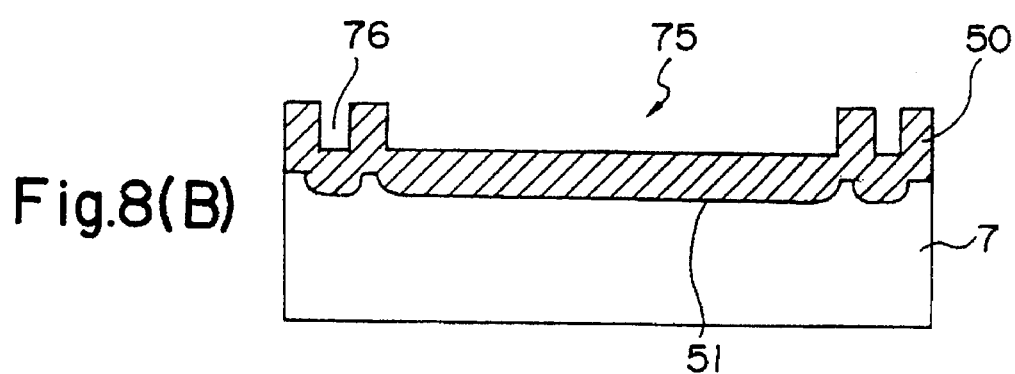

Next, after the photoresist mask 60 is removed, a 6000 Å thick oxide film 51 is grown likewise by wet oxidization. As a result, the oxide film 51 becomes 6000 Å thick in areas where the oxide film was etched in the former etching step, i.e. the portions of the hole 75 for the cavity 71 and the hole 76 as the alignment mark, but 8500 Å thick in areas where the former-made 6000 Å thick oxide film remains (FIG. 8B). This is because the oxidization rate is determined by diffusion at larger oxide thicknesses and is reduced with increasing oxide thickness. Thus the alignment mark using the oxide film is made on the wafer.

Figure 8C:
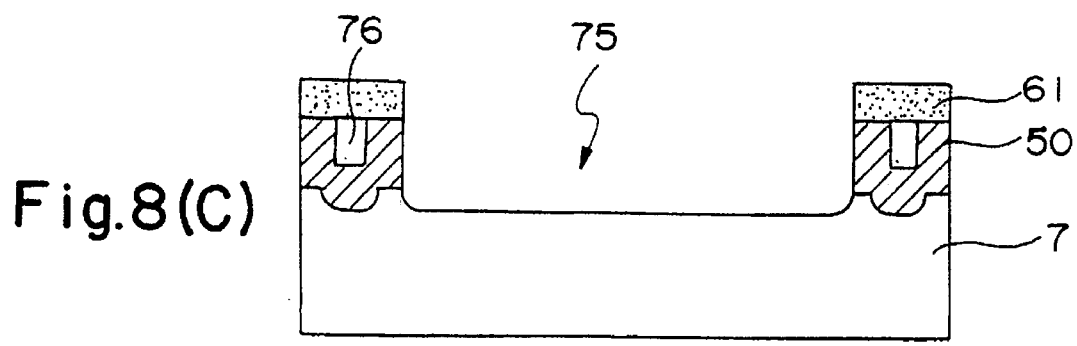
Figure 8D:
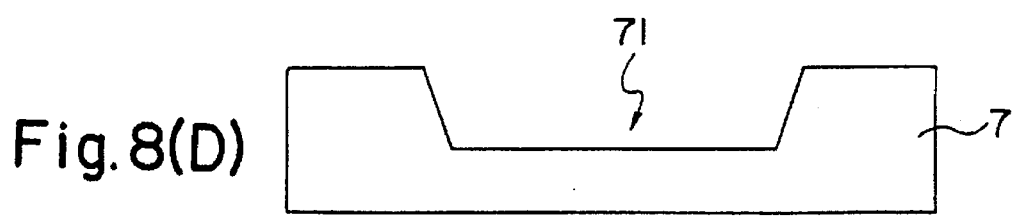

After an alignment protective mask 61 is provided on the alignment mark 76, the oxide film 51 is etched by BFH until 6000 Å of the film is etched off (FIG. 8C). Subsequently, after a part of the cavity 71 is formed by etching, using an anisotropic etchant such as EDP, TMAH, and so on, the etching mask, i.e. the oxide film 50, remaining on the silicon substrate 7 is removed by etching for 30 minutes, using BHF.

Figure 9A:
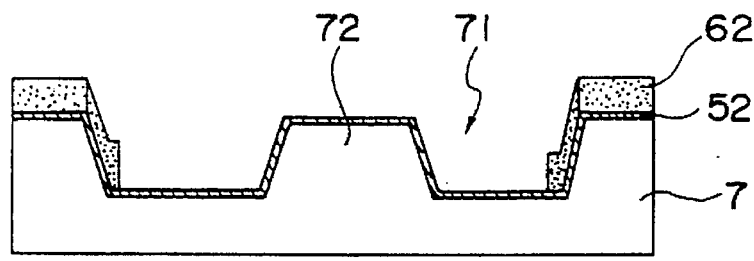
FIGS. 9A to 9D are diagrams showing a second process sequence for manufacturing the preloaded linear beam vibration sensor according to the invention.
Figure 9B:
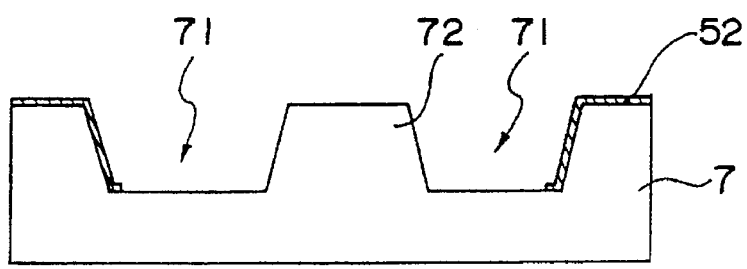
Figure 9C:
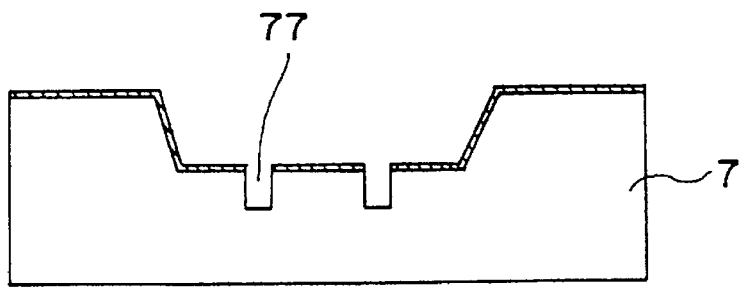
Figure 9D:
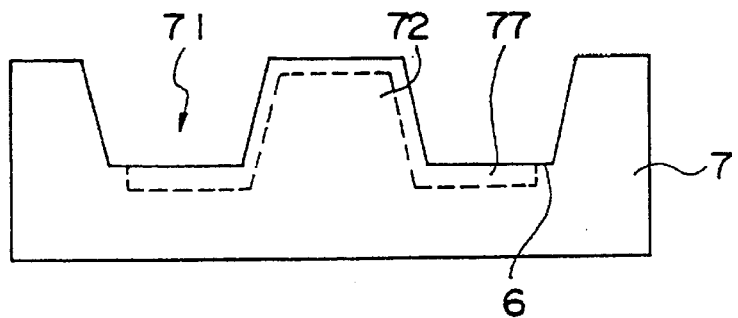

Next explained are the steps for making a groove used to make the beam 2. FIGS. 9A, 9B and 9D are cross sections taken along the B—B line of FIG. 2, and FIG. 9C is a cross section taken along the C—C line of FIG. 2. After a 2 μm thick silicon oxynitride film 52 as an etching mask is made by PECVD in an atmosphere with 1.45 Torr of $SiH_4$, $NH_3$, $N_2O$ and RF at 380° C., the film 52 is annealed at 1000° C. for 30 minutes in nitrogen gas. Subsequently, after coating the film 52 with a photoresist, an etching photoresist mask 62 is made by contact exposure and development (FIG. 9A). Next, the silicon oxynitride film 52 is etched by reactive ion etching (RIE) for 60 minutes in an atmosphere with 60 mTorr of $CHF_3$ and $SF_6$ to make the cavity-making mask (FIG. 9B).

After sufficiently cleaning the silicon substrate 7, a 15 μm deep groove 77 is made by etching for 90 minutes in an atmosphere with 160 mTorr of $Cl_2$ and $SiCl_4$ (FIG. 9C). The overall silicon oxynitride film 52 is thereafter removed by etching using BHF (FIG. 9D). In this figure, the broken line indicates the contour of the patterning groove 77 formed in the silicon substrate 7. With these steps, the patterning groove 77 necessary for making the beam 2 is made.

Figure 10A:
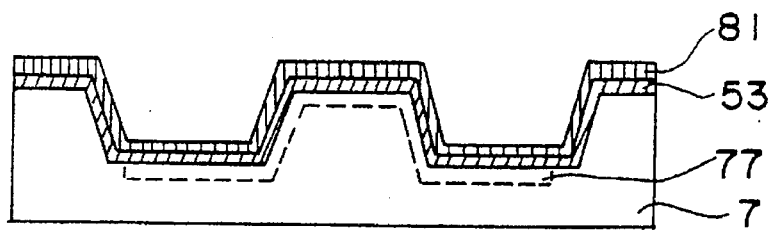
FIGS. 10A to 10E are diagrams showing a third process sequence for manufacturing the preloaded linear beam vibration sensor according to the invention.

Explained below are the steps for making the see-saw beam 5 with reference to FIGS. 10A to 10E. The silicon substrate 7 provided with the beam-making patterning groove 7 made in the previous steps is oxidized in oxygen gas at 1050° C. to make a 1000 Å thick oxide film 53 on the substrate 7. Next, a silicon nitride layer ($SiN_x$) 81 is made by the LPCVD method (FIG. 10A). The layer 81 is later used as a lubricant layer.

Figure 10B:
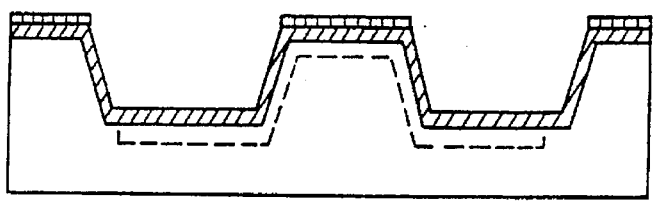

Part of the silicon nitride ($SiN_x$) layer 81 lying under the finally fabricated beam 2 is removed by RIE using $SF_6$ etching gas (FIG. 10B). After that, another 6000 Å is added to the silicon oxide film 53 by chemical vapor deposition (CVD) on the entire surface of the substrate 7 so as to bury the silicon nitride layer ($SiN_x$) in the silicon oxide film 53.

Figure 10C:
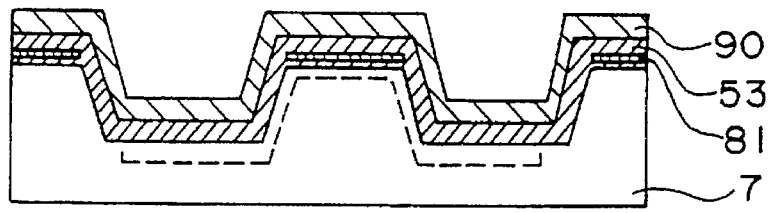
Figure 10D:
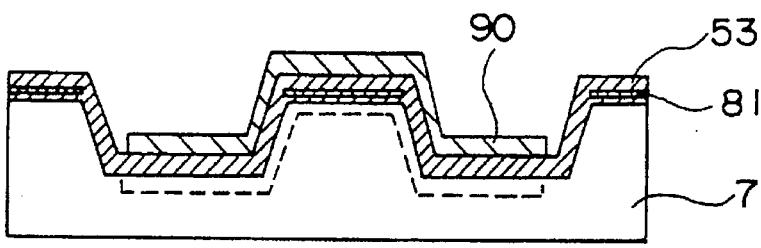
Figure 10E:
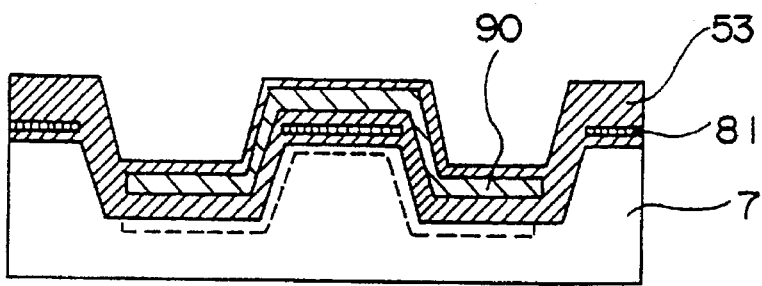

Made on the silicon oxide film 53 is a 2 μm thick polysilicon film 90 for making the beam 2 and the mass 3 (FIG. 10C). Next, after making a photoresist film, and through exposure and development steps, the polysilicon film 90 is etched by RIE using $SF_6$ to obtain the see-saw beam 5 with the pattern of the beams 2 and the masses as shown in FIGS. 2 and 3 (FIG. 10D). Another 1300 Å of oxide is deposited by CVD on the structure of FIG. 10D so as to bury the see-saw beam 5 into the oxide film 53 (FIG. 10E).

Figure 11A:
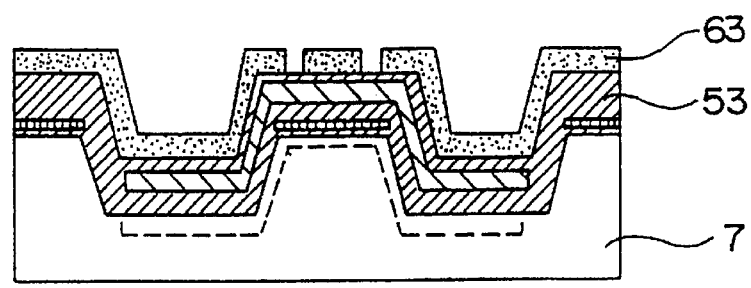
FIGS. 11A and 11B are diagrams showing a fourth process sequence for manufacturing the preloaded linear beam vibration sensor according to the invention.
Figure 11B:
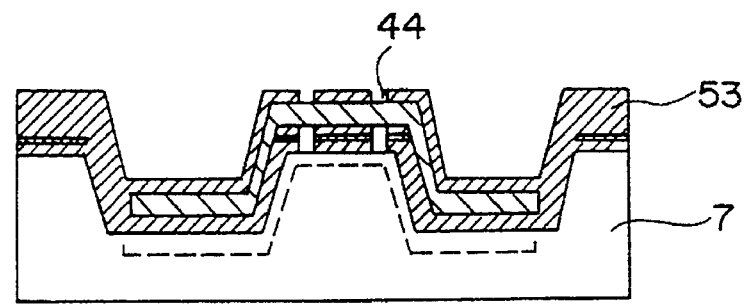

Next explained are the steps for making an anchor hole mask for use in making the hinge with reference to FIGS. 11A and 11B. By using a photoresist made by a known technique on the substrate 7 with the see-saw beam 5 embedded, and through exposure and development steps, an anchor hole mask 63 is made (FIG. 11A). Next, the oxide film 53 is etched by RIE until exposing the silicon substrate 7 to make the anchor hole 44 for access to the surface of the silicon substrate 7. The mask 63 is removed thereafter (FIG. 11B).

Figure 12A:
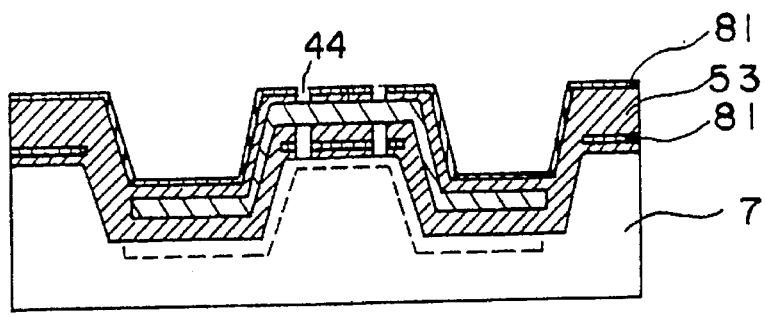
FIGS. 12A to 12D are diagrams showing a fifth process sequence for manufacturing the preloaded linear beam vibration sensor according to the invention.
Figure 12B:
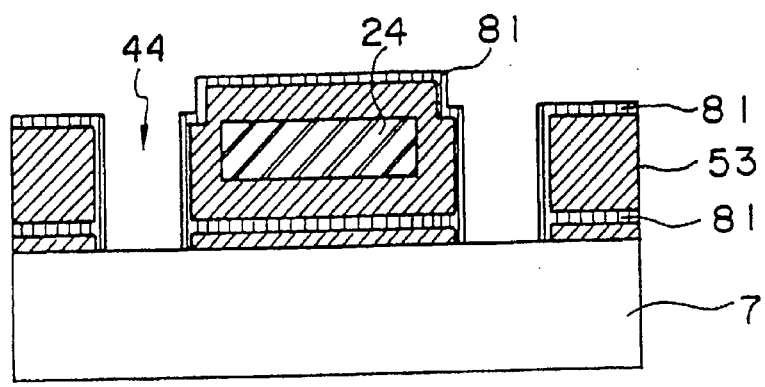

Next explained are the steps for making the hinge portion with reference to FIGS. 12A to 12D. Another silicon nitride film 81, about 1000 Å thick, is made on the substrate 7 containing the anchor hole 44 (FIG. 12A). FIG. 12B shows a cross section of the part of the hinge post 24 in an enlarged scale. The silicon nitride film 81 lies on the upper surface of the oxide film 53 and on the inner surfaces and bottom of the anchor hole 44.

Figure 12C:
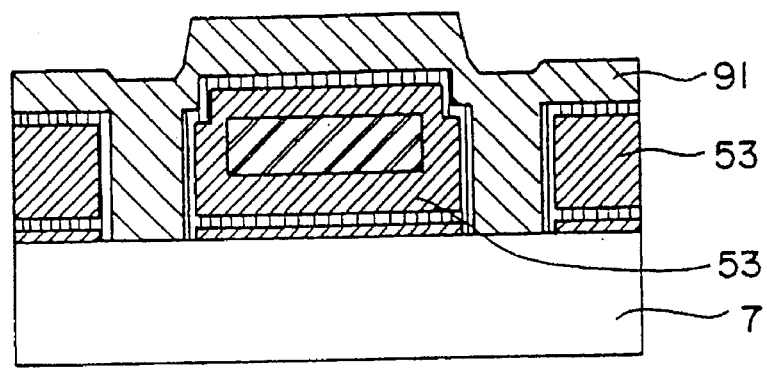
Figure 12D:
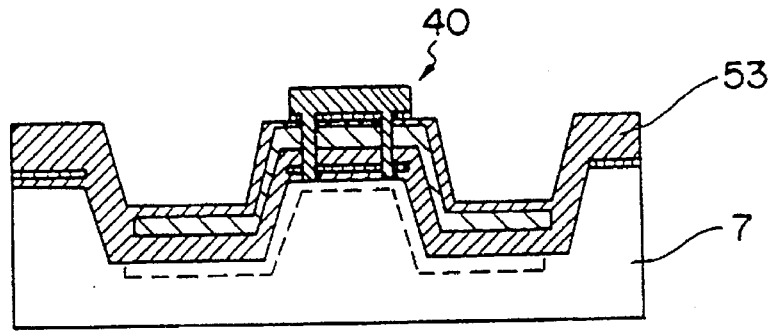

Next made on the structure of FIG. 12B is a 2 μm polysilicon film 91 by the LPCVD method (FIG. 12C). Next, after making a hinge mask by a known technique, the polysilicon film 91 and the silicon nitride film 81 are etched by to make the hinge 40 (FIG. 12D). The interior surfaces of the hinge 40 are covered by the silicon nitride film (grease nitride) 81 which decreases the friction between the hinge post 24 and the hinge 40. The oxide film 53 lying between the hinge post 24 and the hinge 40 is finally removed to make a gap 43 between them.

Figure 13A:
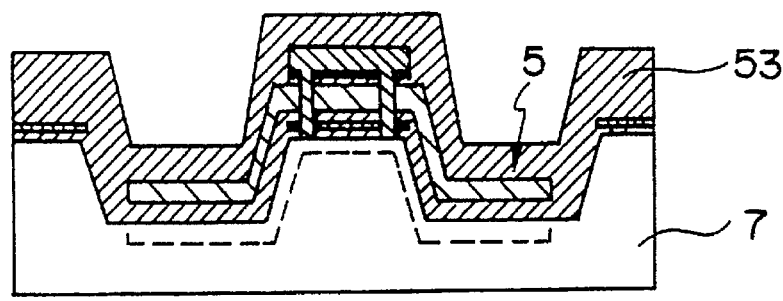
FIGS. 13A to 13D are diagrams showing a sixth process sequence for manufacturing the preloaded linear beam vibration sensor according to the invention.
Figure 13B:
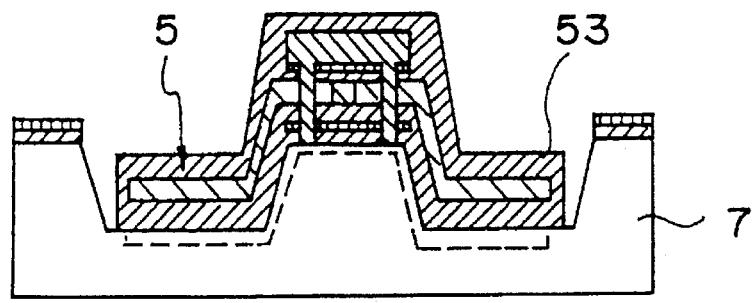

Next explained are the steps for making a floating structure of the see-saw beam 5 from the silicon substrate 7 with reference to FIGS. 13A to 13D. Another 5000 Å thick layer of silicon oxide is deposited by CVD on the silicon substrate 7 with the hinge 40 (FIG. 13A). By making a photoresist by a known technique on the structure, followed by exposure and development, the oxide film 53 is etched by RIE to make the see-saw beam 5 covered by the oxide film 53 (FIG. 13B), and the photoresist is thereafter removed in oxygen gas. In this process, the see-saw beam 5 is firmly held on the silicon substrate 7 by the oxide film 53 and facilitates necessary works onto the structure.

Figure 13C:
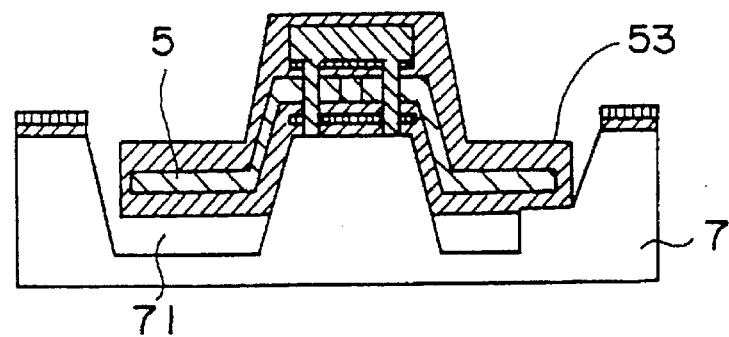
Figure 13D:
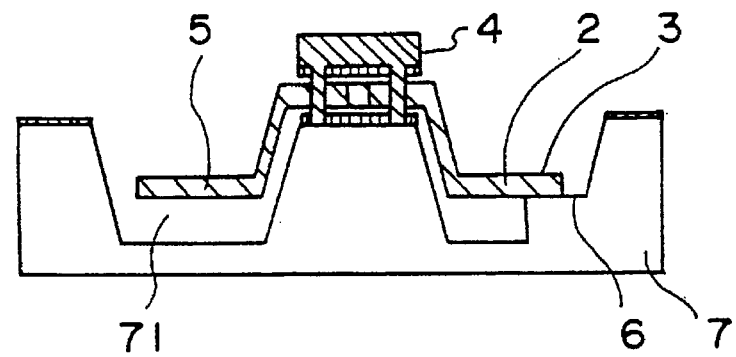

Part of the silicon 7 underlying the see-saw beam 5 is subsequently etched off by using TMAH70C to make the cavity 71 (FIG. 13C). The silicon oxide film 53 made by CVD and subsequently annealed exhibits an excellent resistance against silicon etching using TMAH over six hours. The silicon oxide film 53 covering the see-saw beam 5 and the hinge portion 4 is then etched off by using hydrogen fluoride, thus obtaining the final structure of the lower main body of the preloaded linear beam vibration sensor 1 with the floating see-saw beam 5 (FIG. 13D). After that, the glass cap 8 with metallization of the electrode 9 on its inner surface is bonded by anodic bonding 10 to the lower main body so as to lie over the cavity 71, thus completing the preloaded linear beam vibration sensor 1.

The invention makes it possible to design and fabricate quite a small-scaled vibration sensor adopted to micromachining technologies and can provide a very low-cost, accurate sensor with a good reproducibility. In addition, the invention can provide a vibration sensor with a miniaturized scale, using micromachining technologies, which detects only low-frequency vibrations, using the principle of the unbalanced see-saw design.

Furthermore, the invention describes a possible micromachining processflow to manufacture the unbalanced see-saw design.

What is claimed is:

1. A method for manufacturing a preloaded linear beam vibration sensor including an unbalanced see-saw type see-saw beam having its suspension at an intermediate portion thereof and a mass at each end thereof, comprising the steps of:

providing a substrate;

depositing on said substrate an oxide film;

integrally making on said substrate, via a polysilcon film deposited on said oxide film, a see-saw beam comprising two parallel beams, two masses connecting said beams at respective ends and hinge posts extending from said beams at a location spaced different distances from said masses;

depositing an oxide film on said see-saw beam;

forming on said oxide film covering said hinge posts, via a polysilcon film, hinges which cover said hinge posts;

etching part of said substrate underlying said see-saw beam to form a space permitting pivotal movement of said see-saw beam; and removing said oxide film covering said see-saw beam and said hinge posts to allow said beam to move freely within said hinges.

2. A method for manufacturing a preloaded linear beam vibration sensor including an unbalanced see-saw type see-saw beam having its suspension at an intermediate portion thereof and a mass at each end thereof, comprising the steps of:

providing a substrate;

depositing on said substrate an oxide film;

integrally making on said substrate, via a polysilicon film deposited on said oxide film, a see-saw beam comprising, two parallel beams, two masses connecting said beams at respective ends and hinge posts extending from said beams at a location spaced different distances from said masses;

depositing an oxide film on said see-saw beam;

forming on said oxide film, via a polysilicon film, hinges which cover said hinge posts;

providing a lubricant layer of silicon nitride ($SiN_x$) between said hinge posts and said hinges;

etching part of said substrate underlying said see-saw beam to form a space permitting pivotal movement of said see-saw beam; and removing said oxide film covering said see-saw beam and said hinge posts to allow said beam to move freely within said hinges.

* * * * *